(12) United States Patent
Hamada

(10) Patent No.: US 7,860,534 B2
(45) Date of Patent: Dec. 28, 2010

(54) MOBILE COMMUNICATION TERMINAL, AND PROCESSING PROGRAM THEREOF, FOR SELECTIVELY USING A PLURALITY OF CALLER OWN-NUMBERS

(75) Inventor: Mitsuru Hamada, Tachikawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 508 days.

(21) Appl. No.: 11/703,622

(22) Filed: Feb. 7, 2007

(65) Prior Publication Data

US 2007/0201680 A1  Aug. 30, 2007

(30) Foreign Application Priority Data

Feb. 15, 2006  (JP) .............................. 2006-037325

(51) Int. Cl.
    *H04B 1/38* (2006.01)
(52) U.S. Cl. .................................... 455/558; 455/412.1
(58) Field of Classification Search ................. 455/558, 455/412.1
    See application file for complete search history.

(56) References Cited

U.S. PATENT DOCUMENTS

| 7,389,126 B2 | 6/2008 | Okada |
| 2002/0103009 A1 | 8/2002 | Sato |
| 2005/0048930 A1* | 3/2005 | Arimitsu .................... 455/90.2 |
| 2005/0148366 A1* | 7/2005 | Okada ......................... 455/558 |
| 2006/0095600 A1* | 5/2006 | Lee et al. ...................... 710/14 |
| 2007/0184858 A1* | 8/2007 | Landschaft et al. ......... 455/466 |
| 2008/0167074 A1 | 7/2008 | Van Steenbergen |

FOREIGN PATENT DOCUMENTS

| EP | 1 051 052 | 11/2000 |
| EP | 1 223 768 | 7/2002 |
| EP | 1 553 793 | 7/2005 |
| EP | 1 718 087 | 11/2006 |
| JP | 05-284103 | 10/1993 |
| JP | 2005-72931 | 3/2005 |
| WO | WO 99/45730 | 9/1999 |

OTHER PUBLICATIONS

Japanese Office Action (with an English translation) issued in the corresponding foreign application No. 2006-037325.

* cited by examiner

*Primary Examiner*—Barry W Taylor
(74) *Attorney, Agent, or Firm*—Cohen Pontani Lieberman & Pavane LLP

(57) ABSTRACT

A cellular phone 100 performs an own number extracting process via Step SA3, when a call origination operation is performed. In the own number extracting process, when an own number corresponding with an other-party number of the call recipient is registered in an address book storing section 14*a*, the corresponding own number is extracted from an own number storing section 14*b*. Then, the cellular phone 100 performs a call origination own number setting process via Step SA4. In the call origination own number setting process, when the own number extracted in the own number extracting process and the call origination own number stored in the call origination own number storing section 14*c* match, the extracted own number is set to the call origination own number. At Step SA5, the call is originated to the other-party number using the set call origination number.

5 Claims, 12 Drawing Sheets

US 7,860,534 B2

MOBILE COMMUNICATION TERMINAL, AND PROCESSING PROGRAM THEREOF, FOR SELECTIVELY USING A PLURALITY OF CALLER OWN-NUMBERS

CROSS-REFERENCE TO RELATED APPLICATION

This application is based upon and claims the benefit of priority from the prior Japanese Patent Application No. 2006-037325, filed Feb. 15, 2005, the entire contents of which is incorporated herein by reference.

BACKGROUND OF THE INVENTION

1. Field of the Invention

The present invention relates to a mobile communication terminal and a program thereof. The mobile communication terminal includes a plurality of pieces of own identification information and selectively uses the pieces of own identification information.

2. Description of the Related Art

Conventionally, a following portable wireless terminal is proposed. The portable wireless terminal registers a plurality of own telephone numbers in a user identity module (UIM) card and communicates using a telephone number selected from among the registered telephone numbers by user operation. A portable wireless terminal of this type is disclosed in, for example, the Japanese Laid-open Patent Publication No. Heisei 5-284103.

In a portable wireless terminal that selectively uses a plurality of one's own telephone numbers (hereinafter, referred to as own numbers), it necessary to use the own numbers according to their intended use, such as business telephone numbers and private telephone numbers. Therefore, the portable wireless terminal is required to select an own number every time the portable wireless terminal originates a call. For example, when communicating with another-party to which the portable wireless terminal previously called, the portable wireless terminal is required to select the same own number as that used for the previous call. As a result, this operation becomes bothersome.

SUMMARY OF THE INVENTION

In accordance with an aspect of the present invention, there is provided a mobile communication terminal that selectively uses a plurality of own numbers, comprising: a number information memory means for storing number information corresponding to an own number and an other-party number; a call origination directing means for directing an originating call to the other-party number; a judgment means for judging whether or not the other-party number to which an originating call has been directed by the call origination directing means is present among the number information stored in the number information memory means; a retrieval means for retrieving the own number corresponding to the other-party number when the other-party number has been judged as being present by the judgment means; and a first call origination means for calling the other-party number to which an originating call has been directed by the call origination directing means using the own number retrieved by the retrieval means.

In accordance to another aspect of the invention, there is provided a program executed by a processor in a mobile communication terminal that selectively uses a plurality of own numbers, comprising: a number information memory step of storing number information corresponding to an own number and an other-party number; a call origination directing step of directing an originating call to the other-party number; a judgment step of judging whether or not the other-party number to which an originating call has been directed by the call origination directing step is present among the number information stored by the number information memory step; a retrieval step of retrieving the own number corresponding to the other-party number when the other-party number has been judged as being present by the judgment step; and a first call origination step for calling the other-party number to which an originating call has been directed by the call origination directing step using the own number retrieved by the retrieval step.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

A. First Embodiment

A-1. Configuration

Figure 1:
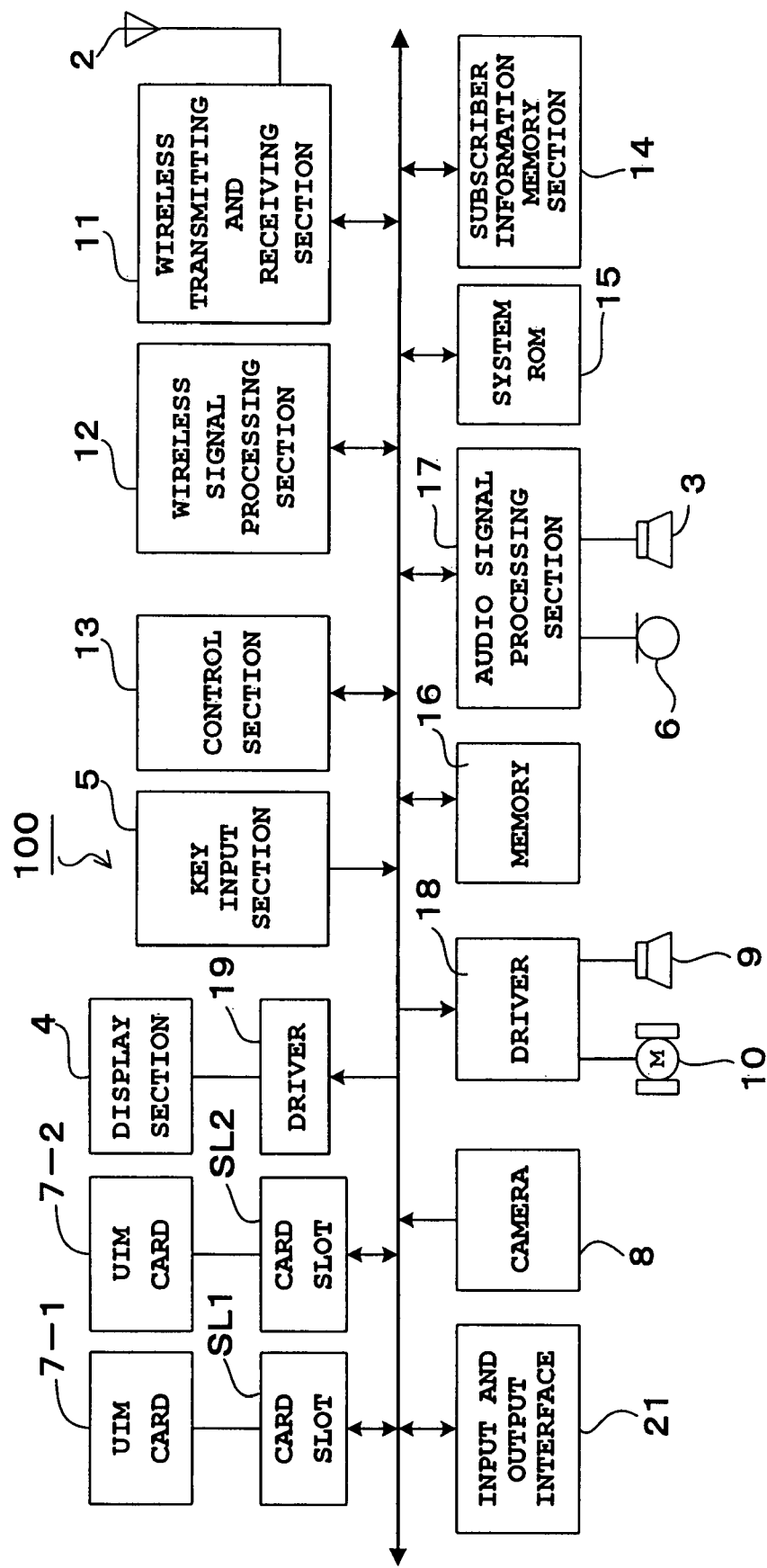
FIG. 1 is a block diagram of a configuration of a cellular phone according to a first embodiment of the present invention.

FIG. 1 is a block diagram of a configuration of a cellular phone 100 (mobile communication terminal) according to a first embodiment of the present invention. The cellular phone 100 has, for example, a folding, open/close-type body structure. The body of the cellular phone 100 (not shown) includes an antenna 2, a speaker 3, a display section 4, a key input section 5, a microphone 6, UIM cards 7-1 to 7-2, card slots SL1 to SL2, a camera 8, a speaker 9, and a vibrator 10. The antenna 2 is used for transmission and reception. The speaker 3 is used to generate a voice. The display section 4 includes a color liquid crystal panel or the like. The microphone 6 is used to input a voice. The UIM cards 7-1 to 7-2 are removable memory media (for example, an integrated circuit [IC] card) that store personal information of a terminal owner, including own number. The UIM cards 7-1 to 7-2 are inserted into the card slots SL1 and SL2. The camera 8 picks up an image. The speaker 9 gives notice of an incoming call. The vibrator 10 gives notice of an incoming call using vibrations.

The key input section 5 includes various dedicated switches and functional switches to which various functions are assigned. As representative dedicated switches, the key input section 5 includes a power switch for turning power ON and OFF, an off-hook/on-hook switch that is operated upon call initiation and line disconnection, and the like. A wireless transmitting and receiving section 11 amplifies a high frequency signal received via the antenna 2 and outputs the amplified signal to a wireless signal processing section 12 in the subsequent stage. At the same time, the wireless transmitting and receiving section 11 performs high frequency amplification of a transmission signal outputted from the wireless signal processing section 12 and sends the amplified signal from the antenna 2.

The wireless signal processing section 12 demodulates the high frequency signal amplified by the wireless transmitting and receiving section 11. At the same time, the wireless signal processing section 12 generates a transmission signal created by modulating transmission data supplied from a control section 13. The control section 13 controls the overall apparatus by sending and receiving commands and data via a system bus. Respective operations related to the summary of the present invention that are performed by the control section 13 will be described in detail hereafter. The operations are a "process at call origination", an "own number extracting process", a "call origination own number extracting process", an "address book updating process", and a "call origination own number switching process", described in detail hereafter. Note that the control 13 functions as call origination directing means, a judgment means, a retrieval means, a first call origination means, a second call origination means, a third call origination means, a selection means, a number information registration means, a usability judgment means, and an update registration means.

Figure 2:
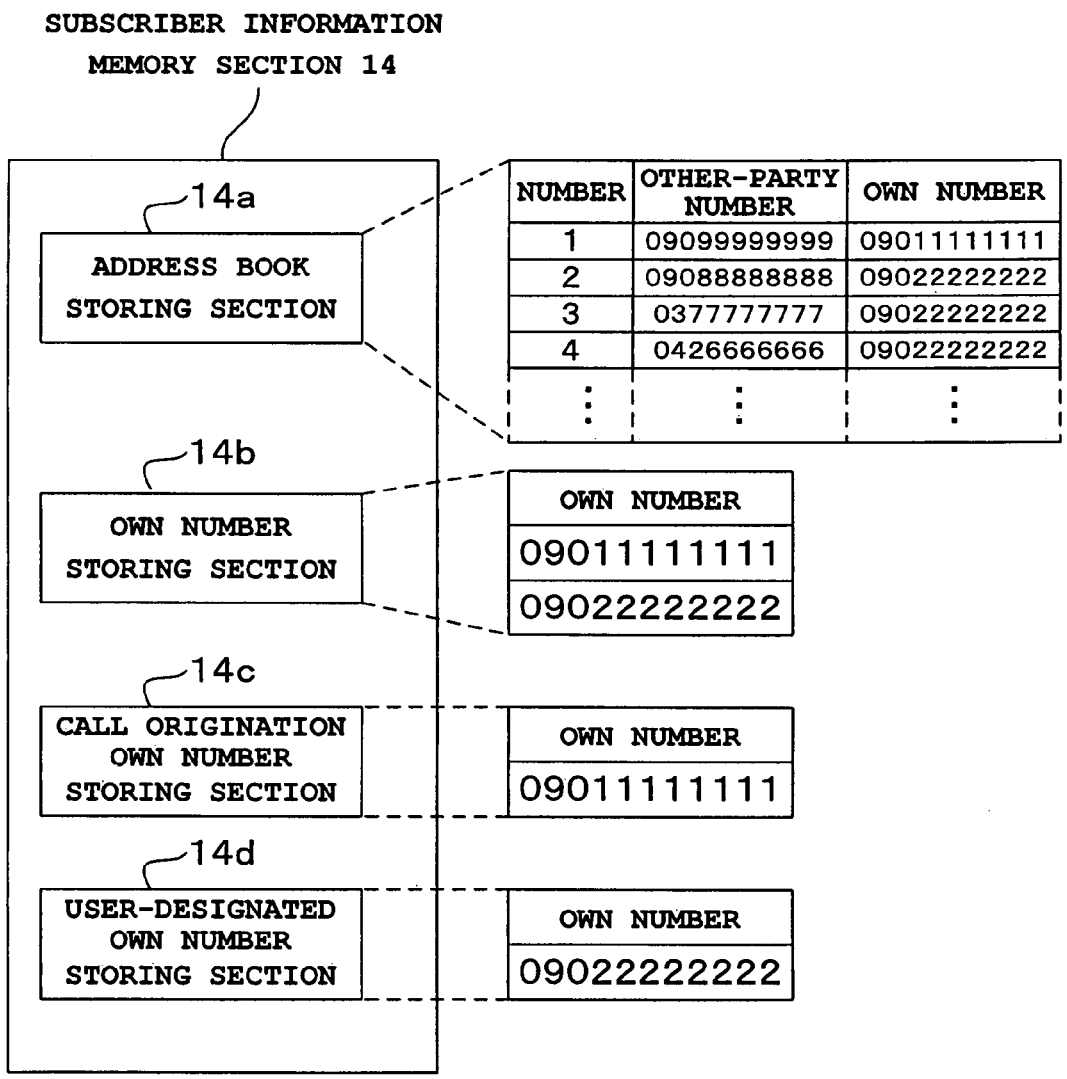
FIG. 2 is a diagram of a configuration of a subscriber information memory section 14.

The subscriber information memory section 14 includes an address book storing section 14a, an own number storing section 14b, a call origination own number storing section 14c, and a user-designated own number storing section 14d, as shown in FIG. 2. The address book storing section 14a stores address book data corresponding the telephone numbers of other parties (hereinafter, referred to as "other-party number") with the own numbers. The own number storing section 14b stores an own number read from the UIM card 7-1 (or 7-2) by the control section 13, via the card slot SL1 (or SL2). In other words, the own number storing section 14b stores the own number that can currently be used. The call origination own number storing section 14c stores the call origination own number that is used to originate a call. The user-designated own number storing section 14d stores an own number designated by the user in advance (user-designated own number).

The own number is equivalent to a personal telephone number of the calling party, namely, that of the caller. The other-party number is equivalent to the telephone number of an other-party destination. The subscriber information memory section 14 functions as a number information storing means and an own number storing means.

A system read-only memory (ROM) 15 stores various screen data that forms an idle screen and the like, in addition to a program executed by the control section 13. The program executed by the control section 13 includes the "process at call origination", the "own number extracting process", the "call origination own number extracting process", the "address book updating process", and the "call origination own number switching process", described hereafter. A memory 16 includes a work area, a mail area, and an image data area. The work area temporarily stores various register and flag data to be used in the processes performed by the control section 13. The mail area stores mail addresses and transmitted and received mail. The image data area stores image pickup data supplied from the camera 8.

An audio signal processing section 17 performs a digital-to-analog (D/A) conversion to convert audio data during a call to audio signals and generates sound from the speaker 3. The audio signal processing section 17 also performs an analog-to-digital (A/D) conversion to convert audio signals outputted from the microphone 6 to audio data and inputs the audio data into the control section 13. A driver 18 drives a light-emitting diode (LED), the speaker 9, and the vibrator 10. The LED is provided in the camera 8. The speaker 9 and the vibrator 10 give notice of an incoming call. A driver 19 drives and displays the display section 4 in accordance with an instruction from the control section 13. The card slots SL1 to SL2 provide the control section 13 with signals indicating the insertion of UIM cards 7-1 to 7-2. An input and output interface 21 exchanges data with an external device that is connected via a serial interface, such as a universal serial bus (USB) cable, under the control of the control section 13.

A-2. Operations

Next, respective operations of the "process at call origination", the "own number extracting process", the "call origination own number extracting process", the "address book updating process", and the "call origination own number switching process", executed by the control section 13 of the cellular phone 100, configured as described above, will be described with reference to FIG. 3 to FIG. 7.

a. Operations of Process at Call Origination

Figure 3:
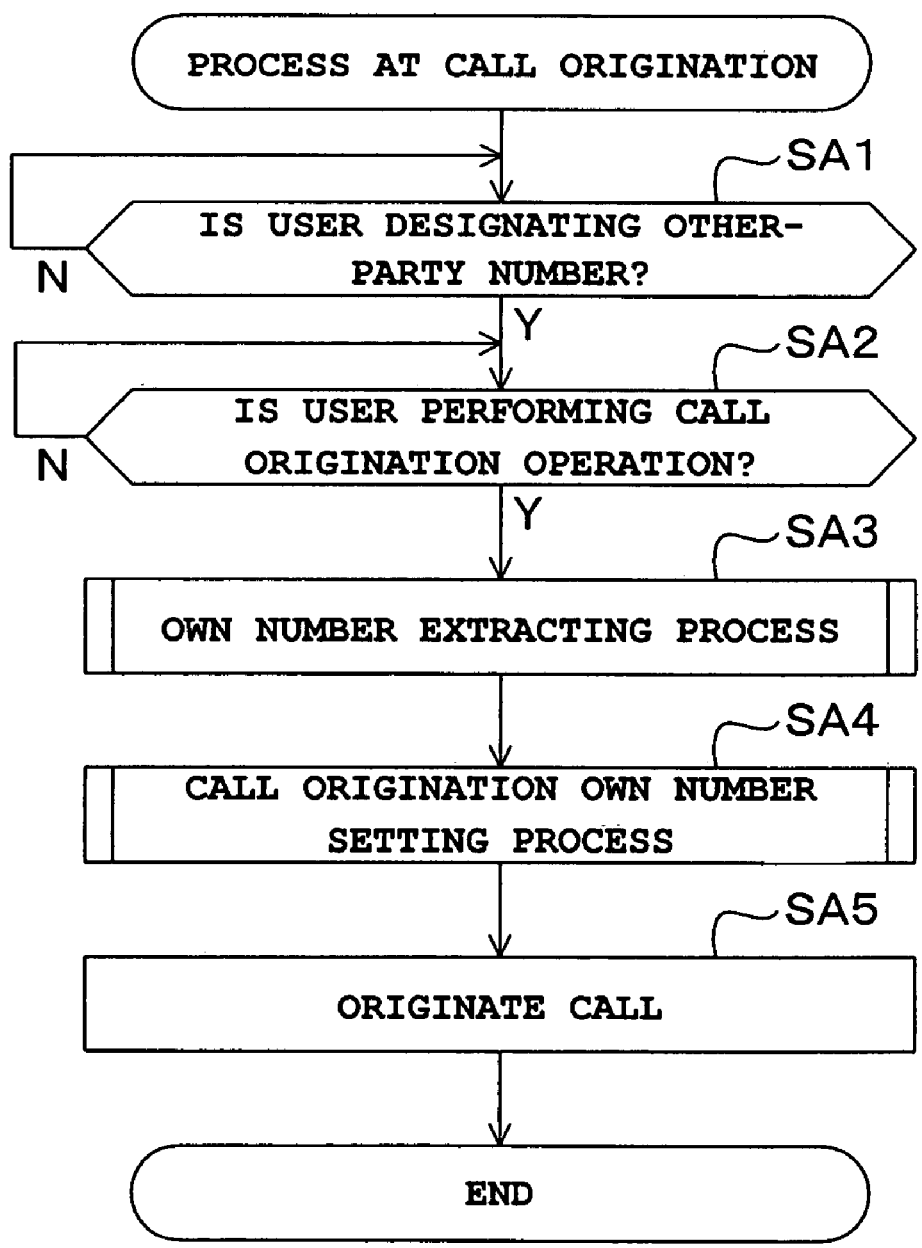
FIG. 3 is a flowchart of operations of a process at call origination.

FIG. 3 is a flowchart of operations of the process at call origination executed by the control section 13. First, at Step SA1, the control section 13 judges whether a key input operation designating an other-party number of the call recipient is performed. More specifically, the control section 13 judges whether a key input operation for inputting the other-party number of the call recipient is performed. Alternatively, the control section 13 judges whether a key input operation designating address book data of the call recipient from the address book data stored in the address book storing section 14a is performed. When the key input operation designating the other-party number is performed, the judgment result is "YES", and the control section 13 proceeds to Step SA2. At Step SA2, the control section 13 waits until an off-hook switch operation (call origination operation) is performed. The judgment result is "YES" in response to the off-hook switch operation, and the control section 13 proceeds to SA3.

At Step SA3, the control section 13 performs the own number extraction process. As described hereafter, in the own number extraction process, when the other-party number of the call recipient is registered in the address book storing section 14a and an own number corresponding with the other-party number is registered in the address book storing section 14a, the control section 13 extracts the corresponding own number from the own number storing section 14b. At the same time, when the other-party number of the call recipient is not registered in the address book storing section 14*a*, or the other-party number is registered but the own number corresponding with the other-party number is not registered in the address book storing section 14*a*, the control section 13 extracts either one of the own number in the user-specified own number storing section 14*d* designated by the user in advance or the own number selected from the own number storing section 14*b* by the user. Next, at Step SA4, the control section 13 performs the call origination own number setting process. As described hereafter, in the call origination own number setting process, when the own number extracted by the own number extraction process at Step SA3 and the call origination own number stored in the call origination own number storing section 14*c* differ, the control section 13 stores the extracted own number in the call origination own number storing section 14*c*.

Then, when an address book update flag is set to "1" or, in other words, when the own number is extracted from the user-specified own number storing section 14*d* or the own number storing section 14*b* by the own number extraction process performed at Step SA3, the control section 13 performs the address book updating process. When the other-party number is not registered in the address book storing section 14*a*, the control section 13 corresponds the own number in the call origination own number storing section 14*c* with the other-party number and registers the corresponded own number and other-party number in the address book storing section 14*a*. When the own number is already corresponded with the other-party number and registered, the own number is updated to the call origination own number in the call origination own number storing section 14*c*, and updated own number is registered.

Subsequently, the control section 13 proceeds to Step SA5. The control section 13 originates a call to a network using the call origination own number stored in the call origination own telephone number 14*c* by the call origination own number setting process at Step SA4.

b. Operations of Own Number Extracting Process

Figure 4:
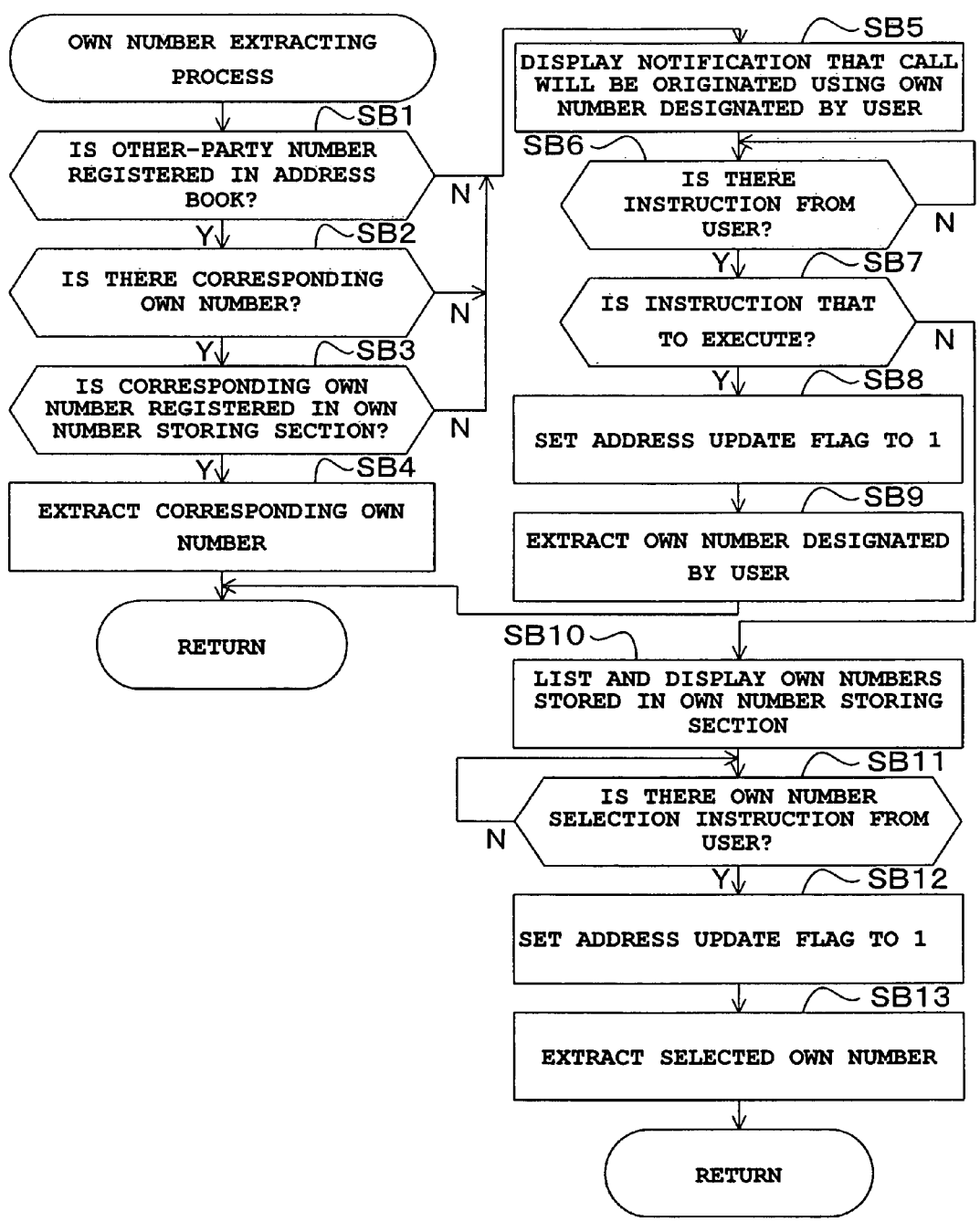
FIG. 4 is a flowchart of operations of an own number extracting process.

Next, operations of the own number extracting process will be described with reference to FIG. 4. When the present process is performed via the above-described Step SA3 of the process at call origination (see FIG. 3), the control section 13 advances the process to Step SB1, as shown in FIG. 4. At Step SB1, the control section 13 judges whether the other-party number designated by the user is registered in the address book storing section 14*a*. When the other-party number is not registered in the address book storing section 14*a*, the judgment result is "NO", and the control section 13 proceeds to Step SB5, described hereafter.

At the same time, when the other-party number designated by the user is registered in the address book storing section 14*a*, the judgment result at Step SB1 is "YES", and the control section 13 proceeds to Step SB2. At Step SB2, the control section 13 searches the address book storing section 14*a* for the own number corresponding with the other-party number and judges whether the own number is found. When the own number corresponding with the other-party number is found, the judgment result is "YES", and the control section 13 proceeds to Step SB3. When the own number corresponding with the other-party number is not found, the judgment result is "NO", and the control section 13 proceeds to Step SB5, described hereafter.

Next, at Step SB3, the control section 13 judges whether the own number corresponding with the other-party number designated by the user is registered in the own number storing section 14*b*. In other words, the control section 13 judges whether the own number corresponding with the other-party number designated by the user can currently be used, since the own number that can currently be used is stored in the own number storing section 14*b*. When the own number corresponding with the other-party is registered in the own number storing section 14*b*, the judgment result is "YES", and the control section 13 proceeds to Step SB4. At Step SB4, the control section 13 extracts the own number registered in the own number storing section 14*b* and completes the process.

On the other hand, when the own number corresponding with the other-party number is not registered in the own number storing section 14*b*, the judgment result is "NO", and the control section 13 proceeds to Step SB5. At Step SB5, the control section 13 displays a notification on a screen in the display section 4 notifying the user that the call will be originated using the own number in the user-designated own number storing section 14*d*, designated by the user in advance. Next, at Step SB6, the control section 13 waits for an instruction from the user (key operation) in response to the notification. Then, when the user performs a key operation, the judgment result is "YES", and the control section 13 proceeds to Step SB7.

At Step SB7, the control section 13 judges whether the key operation performed by the user is an instruction to execute call origination. When the key operation is the instruction to execute call origination or, in other words, when the call is originated using the own number designated by the user, the judgment result at Step SB7 is "YES". The control section 13 proceeds to Step SB8 and sets the address book update flag to "1". Next, at Step SB9, the control section 13 extracts the own number designated by the user from the user-designated own number storing section 14*d* and completes the process.

At the same time, when the key operation is not the instruction to execute call origination or, in other words, when the call is not originated using the own number designated by the user, the judgment result at Step SB7 is "NO", and the control section 13 proceeds to Step SB10. At Step SB10, the control section 13 reads the own numbers stored in the own number storing section 14*b* and lists the own numbers in the display section 4. Next, at Step SB11, the control section 13 waits until the user selects an own number from among any one of the own numbers listed in the display section 4. Then, the judgment result is "YES" in response to the selection instruction from the user. The control section 13 proceeds to Step SB12 and sets the address book update flag to "1". Subsequently, the control section 13 proceeds to Step SB13, extracts the selected own number, and completes the process.

In this way, in the own number extracting process, when the own number corresponding with the other-party number of the call recipient is registered in the address book storing section 14*a*, the control section 13 extracts the corresponding own number from the own number storing section 14*b*. At the same time, when the own number corresponding with the other-party number of the call recipient is not registered in the address book storing section 14*a*, the control section 13 instructs the update of the address book (address book storing section 14*a*). In addition, the control section 13 extracts either one of the own number stored in the user-designated own number storing section 14*d* or the own number selected from within the own number storing section 14*b*.

c. Operations of Call Origination Own Number Setting Process

Figure 5:
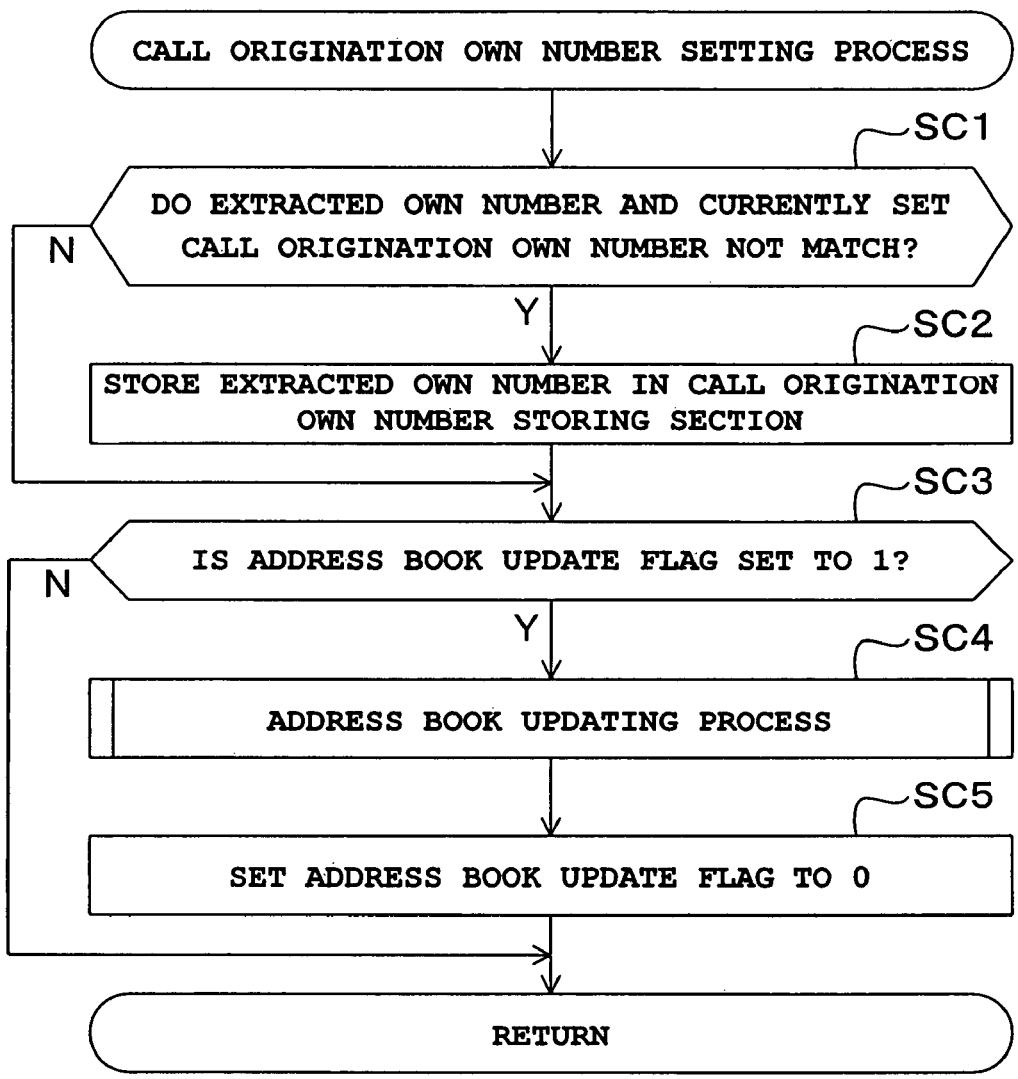
FIG. 5 is a flowchart of operations of a call origination own number setting process.

Next, operations of the call origination own number setting process will be described with reference to FIG. 5. When the present process is performed via the above-described Step SA4 of the process at call origination (refer to FIG. 3), the control section 13 advances the process to Step SC1 shown in FIG. 5. The control section 13 judges whether the own number extracted by the own number extracting process (refer to FIG. 4) and the call origination own number stored in the call origination own number 14c do not match. When the extracted own number and the call origination own number match, the judgment result is "NO", and the control section 13 proceeds to Step SC3, described hereafter. When the extracted own number and the call origination own number do not match, the judgment result is "YES", and the control section 13 proceeds to Step SC2. At Step SC2, the control section 13 stores the own number extracted by the own number extracting process (refer to FIG. 4) in the call origination own number storing section 14c as the call origination own number.

Next, at Step SC3, the control section 13 judges whether the address book update flag is set to "1". When the address book update flag is not set to "1", the judgment result is "NO", and the control section 13 completes the process. At the same time when the address book update flag is set to "1" or, in other words, when the control section 13 extracts the own number designated by the user from the user-designated own number storing section 14d or extracts the own number selected from within the own number storing section 14b in the above-described own number extracting process, the judgment result is "YES". The control section 13 performs an address updating process via Step SC4.

In the address updating process, as described hereafter, when the other-party number is not registered in the address book storing section 14a, the control section 13 corresponds the call origination own number stored in the call origination own number storing section 14c with the other-party number and registers the corresponding call origination own number and other-party number in the address book storing section 14a. At the same time, when the own number is already corresponded with the other-party number and registered, the control section 13 updates the registered own number to the call origination own number in the call origination own number storing section 14c and registers the updated own number. Furthermore, when the own numbers are the same, the control section 13 updates the own numbers to the call origination own number in the call origination own number storing section 14c and registers the updated own numbers. Subsequently, the control section 13 proceeds to Step SC5, resets the address book update flag to "0", and completes the process.

In this way, in the call origination own number setting process, when the own number extracted by the own number extracting process (refer to FIG. 4) and the call origination own number stored in the call origination own number storing section 14c differ, the own number extracted by the own number extracting process is stored in the call origination own number storing section 14c.

When the address book update flag is "1" or, in other words, when the control section 13 extracts the own number designated by the user from the user-designated own number storing section 14d or extracts the own number selected from within the own number storing section 14b, the control section 13 performs the address updating process. When the other-party number is not registered in the address book storing section 14a, the control section 13 corresponds the own number in the call origination own number storing section 14c with the other-party number and registers the corresponding own party number and other-party number in the address book storing section 14a. At the same time, when the own number is already corresponded with the other-party number and registered, the own number is updated to the call origination own number in the call origination own number storing section 14c and registered.

d. Operations of Address Book Updating Process

Figure 6:
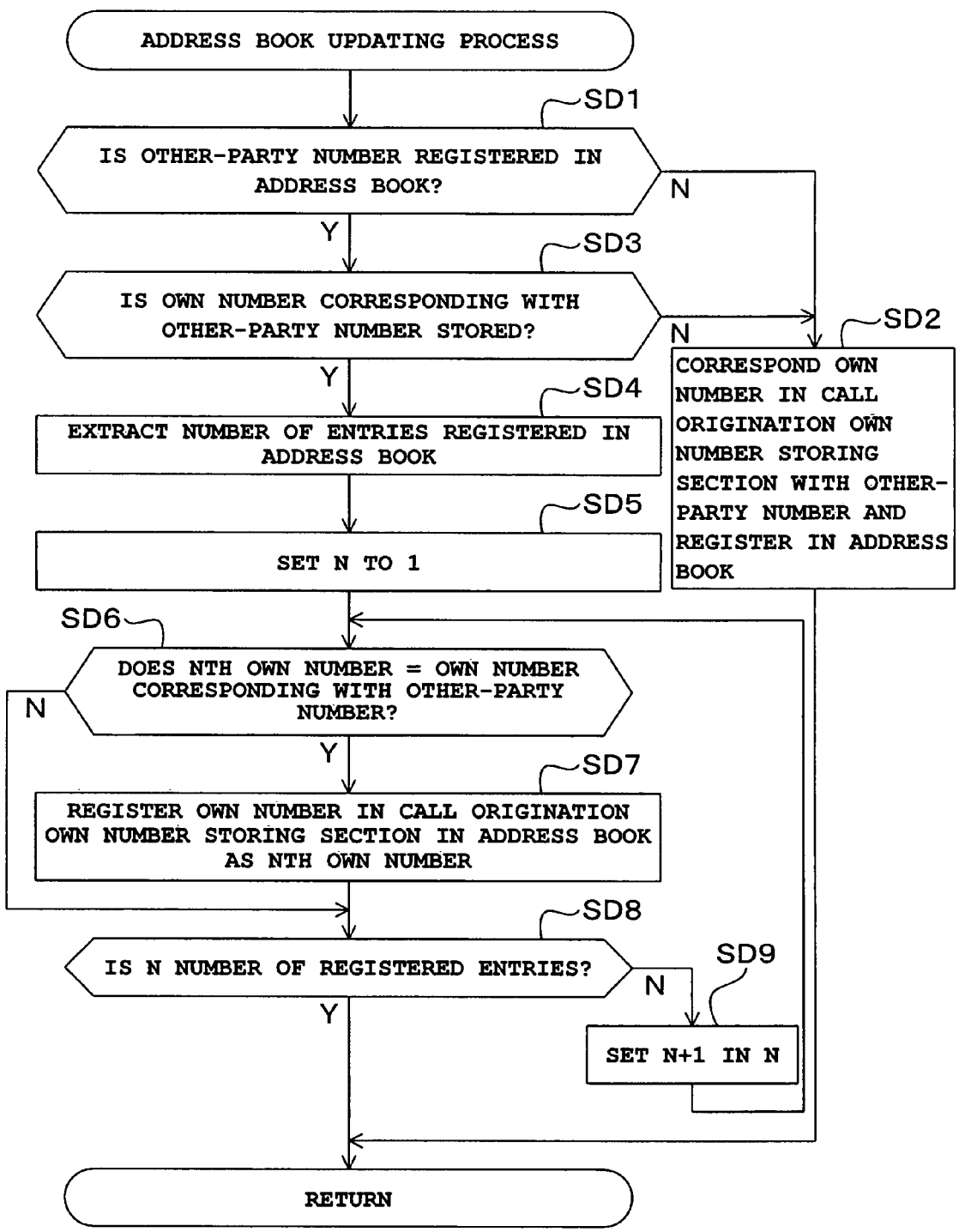
FIG. 6 is a flowchart of operations of an address book updating process.

Next, operations of the address book updating process will be described with reference to FIG. 6. When the present process is performed via the above-described Step SC4 of the call origination own number setting process (see FIG. 5), the control section 13 advances the process to Step SD1 shown in FIG. 6. At Step SD1, the control section 13 judges whether the other-party number designated by the user is registered in the address book storing section 14a. When the other-party number is not registered in the address book storing section 14a, the judgment result is "NO", and the control section 13 proceeds to Step SD2. At Step SD2, the control section 13 corresponds the other-party number designated by the user with the call origination own number stored in the call origination own number storing section 14c and registers the corresponding other-party number and call origination own number in the address book storing section 14a. Then, the control section 13 completes the process.

At the same time, when the other-party number is registered in the address book storing section 14a, the judgment result at Step SD1 is "YES", and the control section 13 proceeds to Step SD3. At Step SD3, the control section 13 judges whether the own number corresponding with the other-party number is stored. When the own number corresponding with the other-party number is not stored, the judgment result is "NO", and the control section 13 proceeds to Step SD2. At Step SD2, the control section 13 corresponds the call origination own number stored in the call origination own number storing section 14c with the other-party number and registers the corresponding call origination own number and other-party number in the address book storing section 14a. Then, the control section 13 completes the process.

On the other hand, when the own number corresponding with the other-party number is stored, the judgment result at Step SD3 is "YES", and the control section 13 proceeds to Step SD4. At Step SD4, the control section 13 extracts the number of entries registered in the address book storing section 14a. Next, at Step SD5, the control section 13 stores an initial value "1" in a pointer register N designating address book data. Then, at Steps SD6 to SD7, the control section 13 searches the address book storing section 14 for the own number corresponding with the other-party number, while incrementing the value in the point register N in steps until the value reaches the number of registered entries extracted at Step SD4. When the corresponding own number is found, the control section 13 updates the own number to the call origination own number in the call origination own number storing section 14c and registers the updated own number.

In other words, at Step SD6, the control section 13 judges whether the own number within the Nth address book data, designated by the value in the pointer register N, matches the own number corresponding with the other-party number, in the address book storing section 14a. When the numbers do not match, the judgment result is "NO", and the control section 13 proceeds to Step SD8. At Step SD8, the control section 13 judges whether the value in the pointer register N has reached the number of registered entries extracted at Step SD4. In other words, the control section 13 judges whether the search is completed. When the search is not completed, the judgment result is "NO", and the control section 13 proceeds to Step SD9. After incrementing the pointer register N in steps, the control section 13 returns the process to Step SD6.

Then, when the Nth own number designated by the incremented value in the pointer register N matches the own number corresponding with the other-party number, the judgment result at Step SD6 is "YES", and the control section 13 proceeds to Step SD7. At Step SD7, the control section 13 updates the call origination own number read from the call origination own number storing section 14c to the Nth own number and registers the updated own number in the address book storing section 14a. Next, the control section 13 proceeds to Step SD8 and judges whether the search is completed. When the search is completed, the judgment result is "YES", and the control section 13 completes the process.

In this way, in the address book updating process, when the other-party number designated by the user is not registered in the address book storing section 14a, the control section 13 corresponds the other-party number with the call origination own number in the call origination own number storing section 14c and registers the corresponding other-party number and call origination number in the address book storing section 14a. At the same time, when the other-party number is registered in the address book storing section 14a and the own number is corresponded with the other-party number and registered, the control section 13 updates the own number to the call origination own number stored in the call origination own number storing section 14c and registers the updated own number. Furthermore, when the own numbers are the same, the control section 13 updates the own numbers to the call origination own number in the call origination own number storing section 14c and registers the updated own numbers.

e. Operations of Call Origination Own Number Switching Process

Figure 7:
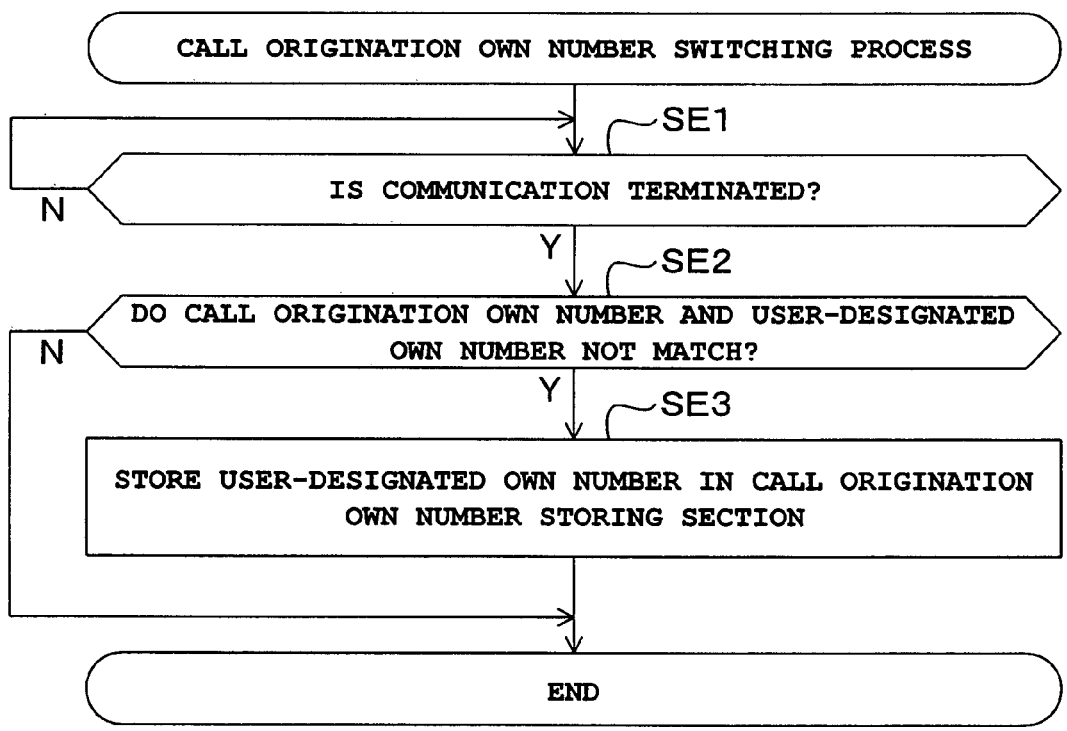
FIG. 7 is a flowchart of operations of a call origination own number switching process.

Next, operations of the call origination own number switching process will be described with reference to FIG. 7. The control section 13 performs a process at communication termination shown in FIG. 7 and proceeds to Step SE1, in response to an on-hook switch operation performed upon communication termination. Then, the judgment result at Step SE1 is "YES" in response to the communication termination, and the control section 13 proceeds to Step SE2. At Step SE2, the control section 13 judges whether the call origination own number stored in the call origination own number storing section 14c and the user-designated own number stored in the user-designated own number storing section 14d do not match. When the call origination own number and the user-designated own number match, the judgment result is "YES". The control section 13 completes the process without performing any operations. When the call origination own number and the user-designated own number do not match, the judgment result is "NO", and the process proceeds to Step SE3. At Step SE3, the control section 13 registers the user-designated own number read from the user-designated own number storing section 14d in the call origination own number storing section 14c as the call origination own number and completes the process.

As described above, according to the first embodiment, when the own number corresponding with the other-party number of the call recipient is registered in the address book storing section 14a, the control section 13 extracts the corresponding own number from the own number storing section 14b. When the extracted own number and the call origination own number stored in the call origination own number storing section 14c match, the control section 13 uses the call origination own number and originates the call to the other-party number. As a result, the operation for selecting the own number every time a call is originated becomes unnecessary. The own numbers to be used at call origination can be used separately based on use, without the selection operation being performed.

In addition, when the own number corresponding with the other-party number of the call recipient is not registered in the address book storing section 14a, the control section 13 extracts either one of the own number designated by the user or the own number selected by the user from the own number storing section 14b. When the extracted own number and the call origination own number stored in the call origination own number storing section 14c differ, the control section 13 stores the extracted own number in the call origination own number storing section 14c. Then, when the other-party number is not registered in the address book storing section 14a, the control section 13 corresponds the call origination own number stored in the call origination own number storing section 14c with the other-party number and registers the other-party number in the address book storing section 14a. When the own number corresponding with the other-party number is registered, the control section 13 updates the own number to the call origination own number stored in the call origination own number storing section 14c and registers the updated own number. Furthermore, when the own numbers are the same, the control section 13 updates the own numbers to the call origination own number in the call origination own number storing section 14c and registers the updated own numbers. As a result, when the next and subsequent calls are originated, the operation to select the own number becomes unnecessary. The own numbers to be used at call origination can be used separately based on use, without the selection operation being performed.

In addition, when the control section 13 judges whether the call origination number stored in the call origination own number storing section 14c and the user-designated own number stored in the user-designated own number storing section 14d differ upon communication termination and judges that both own numbers differ, the user-designated own number stored in the user-designated own number storing section 14d is registered in the call origination own number storing section 14c as the call origination own number. Therefore, when registering an other-party number to which the user is calling for the first time in the address book storing section 14a, the control section 13 can correspond the own number designated by the user with the other-party number and register the corresponding own number as the other-party number. As a result, when the next and subsequent calls are originated, the operation to select the own number becomes unnecessary. The own numbers to be used at call origination can be used separately based on use, without the selection operation being performed.

B. Second Embodiment

B-1. Configuration

Figure 8:
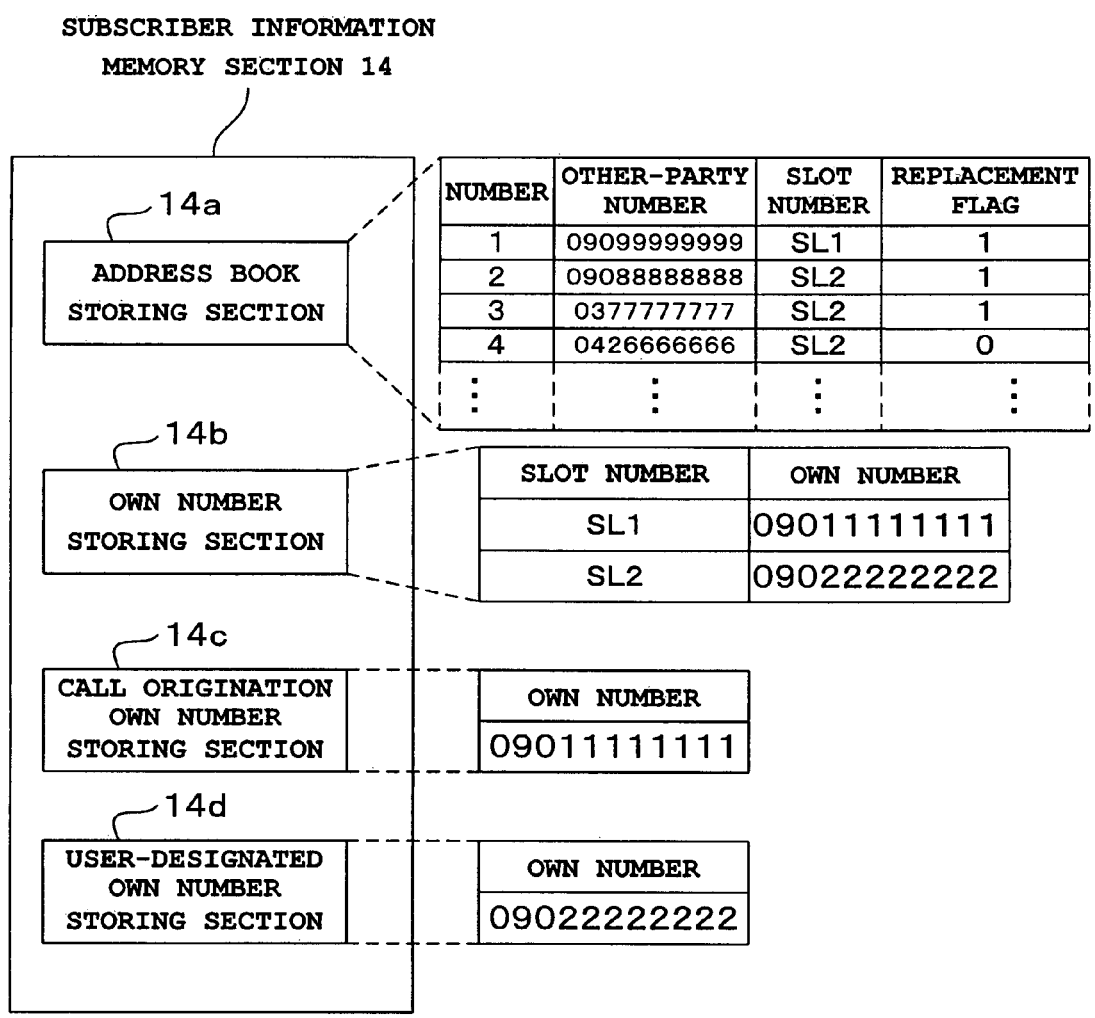
FIG. 8 is a diagram of a configuration of a subscriber information memory section 14 according to a second embodiment.

The overall configuration according to the second embodiment is the same as that according to the first embodiment, shown in FIG. 1. Therefore, explanations thereof are omitted. According to the second embodiment, as shown in FIG. 8, the data configurations in the address book storing section 14a and the own number storing section 14b of the subscriber information memory section 14 differ from those according to the first embodiment. Hereafter, a configuration of the subscriber information memory section 14 according to the second embodiment will be described with reference to FIG. 8.

The subscriber information memory section 14 includes the address book storing section 14a, the own number storing section 14*b*, the call origination own number storing section 14*c*, and the user-designated own number storing section 14*d*. The own number storing section 14*b* corresponds the own number read by the control section 13 from the UIM card 7-1 (or 7-2), via the card slot SL1 (or SL2), with the slot number and stores the corresponding own number and slot number. The own number storing section 14*b* corresponds the own number than can currently be used with the slot number and stores the corresponding own number and slot number. The address book storing section 14*a* stores address book data including the other-party number, the slot number corresponding with the own number and stored in the own number storing section 14*b*, and a UIM card replacement flag (described hereafter). The call origination own number storing section 14*c* stores the call origination own number used to originate a call. The user-designated own number storing section 14*d* stores the own number designated by the user in advance (user-designated own number). The subscriber information storing section 14 functions as a memory means.

B-2. Operations

Next, operations according to the second embodiment will be explained with reference to FIG. 9 and FIG. 10. Hereafter, respective operations of an "UIM card replacing process", a "slot number storing process", the "own number extracting process", and the "address book updating process" differing from the first embodiment will be described hereafter.

a. Operations of UIM Card Replacing Process

Figure 9:
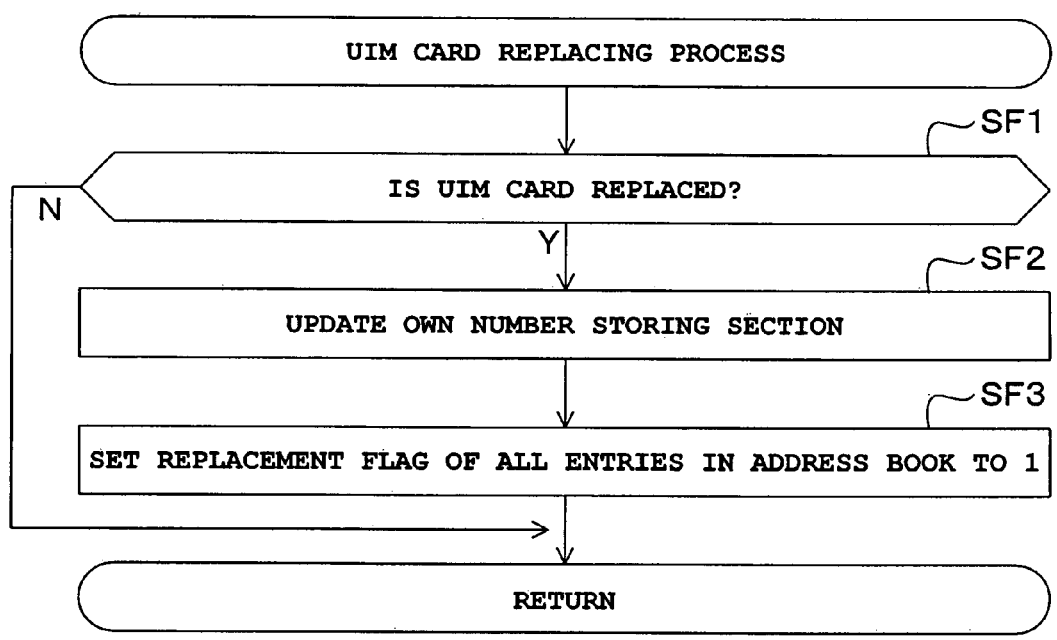
FIG. 9 is a flowchart of operations of a UIM card replacing process according to the second embodiment.
Figure 10:
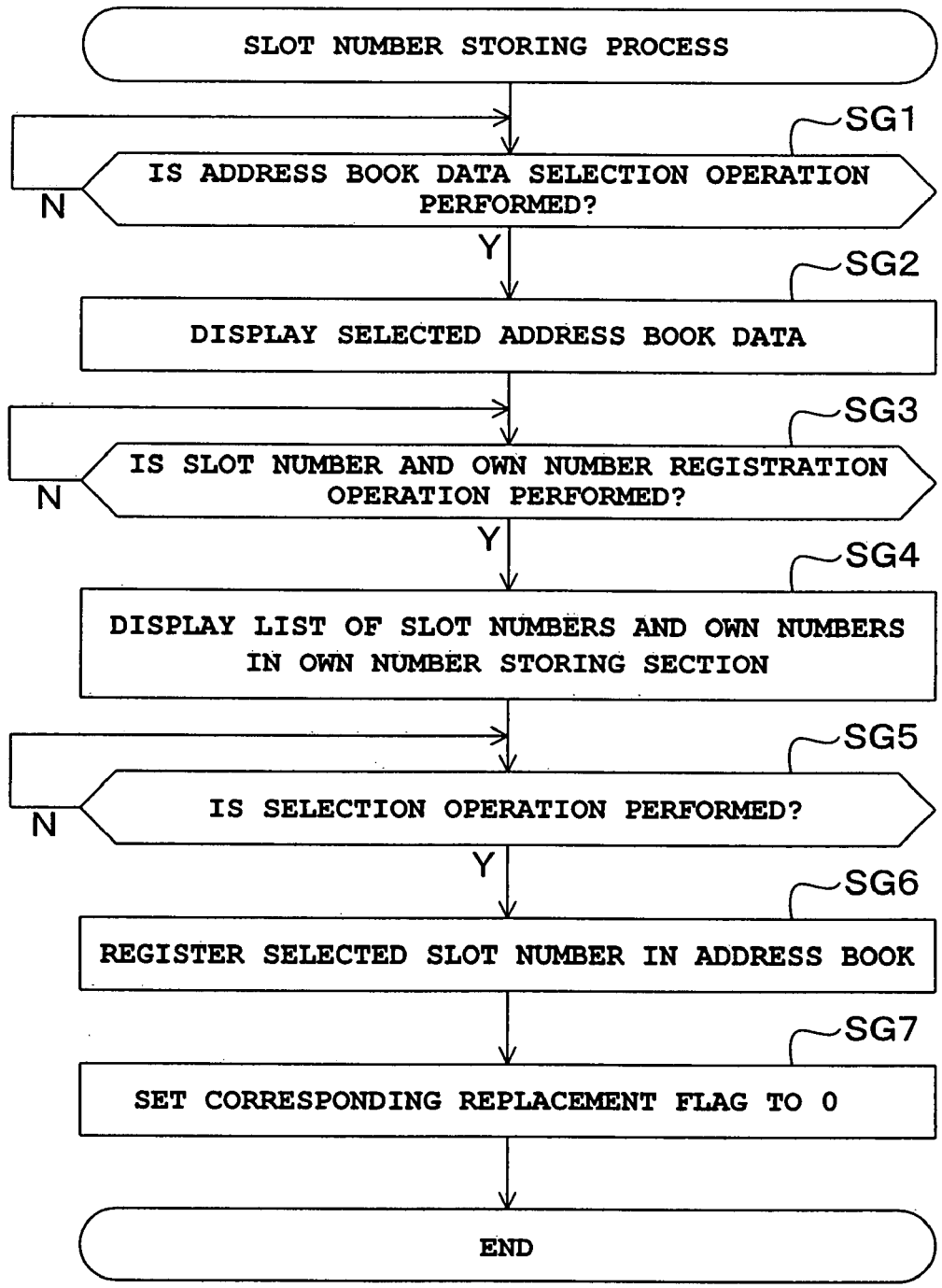
FIG. 10 is a flowchart of operations of a slot number storing process according to the second embodiment.

FIG. 9 is a flowchart showing operations of the UIM card replacing process. When the power of the cellular phone 100 is turned ON, the control section 13 advances the process to Step SF1, shown in FIG. 9, and judges whether the UIM card is replaced. When the UIM card is not replaced, the judgment result is "NO". The control section 13 completes the process without performing any operations. On the other hand, when the UIM card is replaced, the judgment result is "YES", and the control section 13 proceeds to Step SF2. At Step SF2, the control section 13 corresponds the own number read from the UIM card 7-1 (or 7-1), via the card slot SL1 (or SL2), with the slot number and stores the corresponding own number and slot number in the own number storing section 14*b*. Then, the control section 13 proceeds to Step SF3. At Step SF3, the control section 13 sets the replacement flags of all address book data stored in the address book storing section 14*a* to "1" and completes the process. Setting the replacement flags within all address book data to "1" indicates that the UIM card has been replaced.

b. Operations of Slot Number Storing Process

Next, operations of the slot number storing process will be described with reference to FIG. 10. When the slot number storing process is performed, the control section 13 advances the process to Step SG1, shown in FIG. 10. At Step SG1, the control section 13 judges whether an address book data selection operation is performed. The address book data selection operation refers to, for example, the control section 13 displaying the other-party numbers within the address book data registered in the address book storing section 14*a* on the screen of the display section 4 and selecting the address book data including the desired other-party number from among the displayed other-party numbers. When the user performs such an address book data selection operation, the judgment result is "YES", and the control section 13 proceeds to Step SG2. At Step SG2, the control section 13 displays the content of the selected address book data (the other-party number, the slot number, and the replacement flag) on the screen of the display section 4.

Next, at Step SG3, the control section 13 judges whether a slot number and own number registration operation is performed. When the user performs the slot number and own number registration operation, the judgment result is "YES", and the control section 13 proceeds to Step SG4. At Step SG4, the control section 13 lists the slot numbers stored in the own number storing section 14*b* and the own numbers corresponding with the slot numbers in the display section 4. Next, at Step SG5, the control section 13 judges whether the selection operation is performed. When the user performs the selection operation, the judgment result is "YES", and the control section 13 proceeds to Step SG6. At Step SG6, the control section 13 registers the selected slot number in the address book storing section 14*a* as the slot number of the address book data selected by the address book data selection operation performed at Step SG1. Then, at Step SG7, the control section 13 resets the replacement flag to zero. The replacement flag is that within the address book data of which the slot number is updated. Then, the control section 13 completes the process.

c. Operations of Own Number Extracting Process

Figure 11:
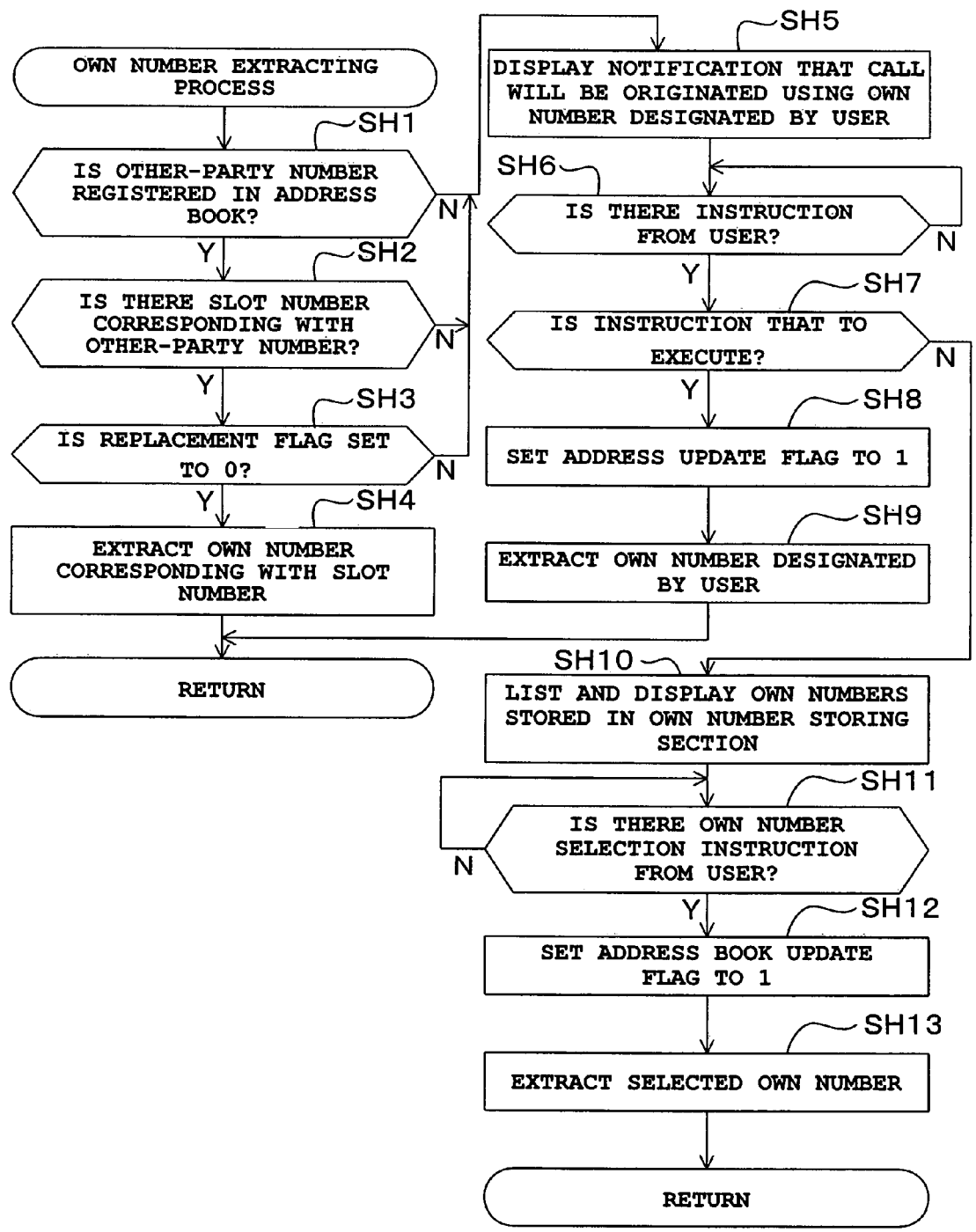
FIG. 11 is a flowchart of operations of an own number extracting process according to the second embodiment.

Next, operations of the own number extracting process will be explained with reference to FIG. 11. As in the first embodiment, when the present process is performed via Step SA3 of the process at call origination (see FIG. 3), the control section 13 advances the process to Step SH1 shown in FIG. 11. At Step SH1, the control section 13 judges whether the other-party number designated by the user is registered in the address book storing section 14*a* of the subscriber information memory section 14. When the other-party number is not registered in the address book storing section 14*a*, the judgment result is "NO", and the control section 13 proceeds to Step SH5, described hereafter.

At the same time, when the other-party address designated by the user is registered in the address book storing section 14*a*, the judgment result at Step SH1 is "YES", and the process proceeds to Step SH2. At Step SH2, the control section 13 searches the address book storing section 14*a* for the slot number corresponding with the other-party number and judges whether the slot number is found. When the slot number corresponding with the other-party number is found, the judgment result is "YES", and the control section 13 proceeds to Step SH3. When the slot number corresponding with the other-party number is not found, the judgment result is "NO", and the control section 13 proceeds to Step SH5, described hereafter.

Next, at Step SH3, the control section 13 judges whether the replacement flag corresponding with the other-party number designated by the user is set to "0". When the slot number is registered in the address book storing section 14*a* by the slot number storing process (see FIG. 10) and the replacement flag is set to "0", the judgment result is "YES", and the control section 13 proceeds to Step SH4. At Step SH4, the control section 13 extracts the own number that is corresponded with the slot number and stored. Then, the control section 13 completes the process.

On the other hand, when the UIM card is replaced and the replacement flag is set to "1" by the UIM card replacing process (see FIG. 9) as a result, the judgment result at Step SH4 is "NO", and the control section 13 proceeds to Step SH5. At Step SH5, the control section 13 displays a notification on the screen in the display section 4 notifying the user that the call will be originated using the own number designated by the user. Next, at Step SH6, the control section 13 waits for an instruction from the user (key operation) in response to the notification.

Then, when the user performs a key operation, the judgment result is "YES", and the control section 13 proceeds to Step SH7. At Step SH7, the control section 13 judges whether the key operation performed by the user is an instruction to execute call origination. When the key operation is the instruction to execute call origination or, in other words, when the call is originated using the own number designated by the user, the judgment result at Step SH7 is "YES". The control section 13 proceeds to Step SH8 and sets the address book update flag to "1". Next, at Step SH9, the control section 13 extracts the own number designated by the user from the user-designated own number storing section 14d in the subscriber information memory section 14 and completes the process.

At the same time, when the key operation is not the instruction to execute call origination or, in other words, when the call is not originated using the own number designated by the user, the judgment result at Step SH7 is "NO", and the control section 13 proceeds to Step SH10. At Step SH10, the control section 13 reads the own numbers stored in the own number storing section 14b of the subscriber information memory section 14 and lists the own numbers in the display section 4. Next, at Step SH11, the control section 13 waits until the user selects any one of the own numbers listed in the display section 4. Then, the judgment result is "YES" in response to the selection instruction from the user. The control section 13 proceeds to Step SH12 and sets the address book update flag to "1". Subsequently, the control section 13 proceeds to Step SH13, extracts the selected own number from the own number storing section 14b, and completes the process.

In this way, in the own number extracting process, when the other-party number of the call recipient and the corresponding slot number are registered in the address book storing section 14a and the replacement flag attached to the corresponding slot number is set to "0", the control section 13 extracts the own number corresponding with the slot number from the own number storing section 14b. At the same time, when the other-party number of the call recipient and the corresponding slot number are not registered in the address book storing section 14a, or when the other-party number of the call recipient and the corresponding slot number are registered in the address book storing section 14a but the replacement flag attached to the corresponding slot number is set to "1", the control section 13 instructs the updating of the address book. In addition, the control section 13 extracts either one of the own number designated by the user or the own number selected from within the own number storing section 14b.

d. Operations of Address Book Updating Process

Figure 12:
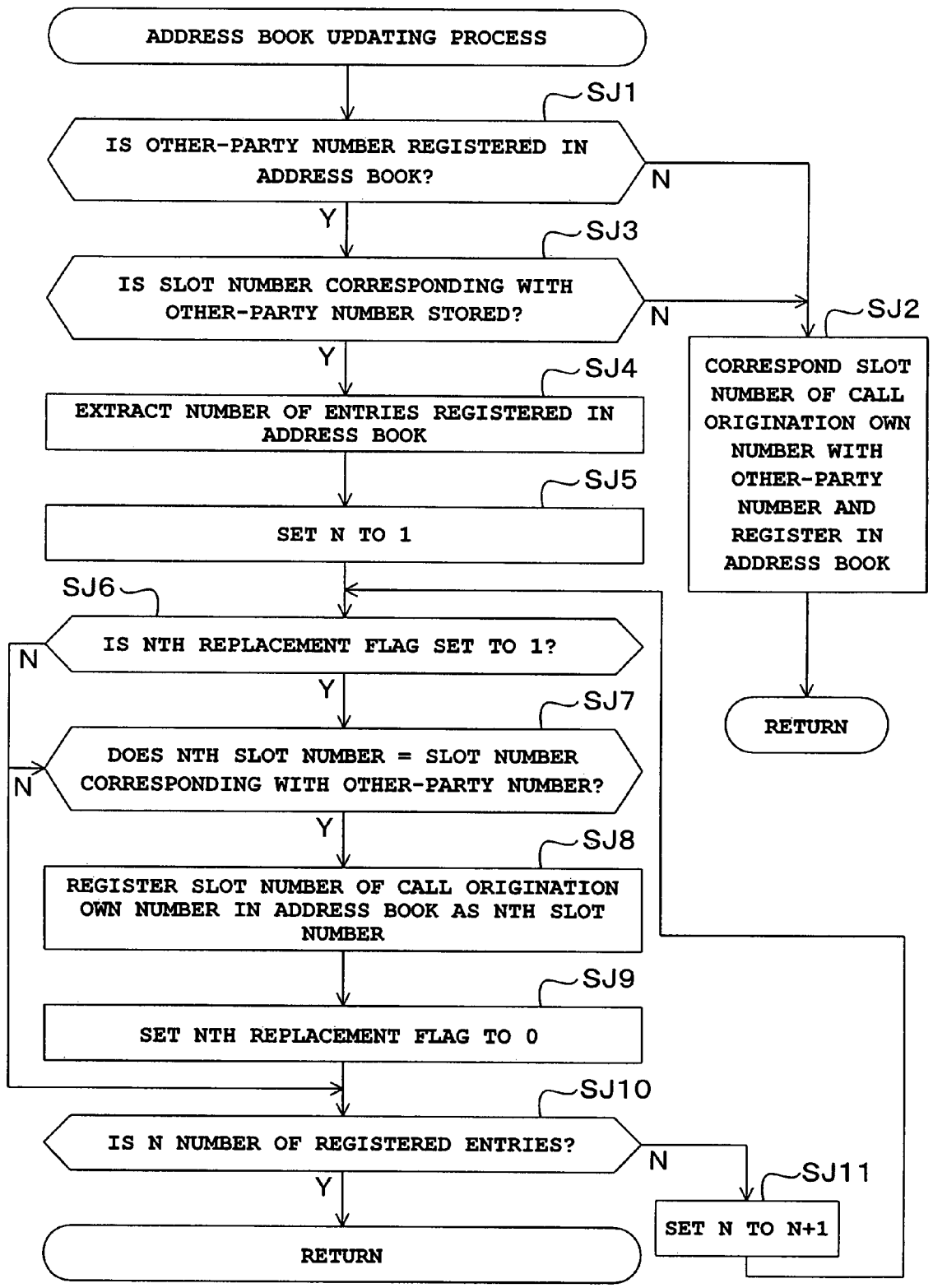
FIG. 12 is a flowchart of operations of an address book updating process according to the second embodiment.

Next, operations of the address book updating process will be described with reference to FIG. 12. As in the first embodiment, when the present process is performed via Step SC4 of the call origination own number setting process (see FIG. 5), the control section 13 advances the process to Step SJ1 shown in FIG. 12. At Step SJ1, the control section 13 judges whether the other-party number designated by the user is registered in the address book storing section 14a of the subscriber information memory section 14. When the other-party number is not registered in the address book storing section 14a, the judgment result is "NO", and the control section 13 proceeds to Step SJ2. At Step SJ2, the control section reads the slot number corresponding with the own number matching the call origination own number stored in the call origination own number storing section 14c from the own number storing section 14b. The control section 13 corresponds the read slot number with the other-party number designated by the user and registers the corresponding slot number and other-party number in the address book storing section 14a. Then, the control section 13 completes the process.

At the same time, when the other-party number is registered in the address book storing section 14a, the judgment result at Step SJ1 is "YES", and the control section 13 proceeds to Step SJ3. At Step SJ3, the control section 13 judges whether the slot number corresponding with the other-party number is stored. When the slot number corresponding to the other-party number is not stored, the judgment result is "NO", and the control section 13 proceeds to Step SJ2. At Step SJ2, the control section 13 corresponds the slot number of the own number matching the call origination own number with the other-party number and registers the corresponding slot number and other-party number in the address book storing section 14a.

On the other hand, when the slot number corresponding with the other-party number is stored, the judgment result at Step SJ3 is "YES", and the control section 13 proceeds to Step SJ4. At Step SJ4, the control section 13 extracts the number of entries registered in the address book storing section 14a. Next, at Step SJ5, the control section stores the initial value "1" in the pointer register N designating the address book data. Then, at Step SJ6, the control section 13 judges whether the replacement flag of the Nth address book data designated by the value in the pointer register N in the address book storing section 14a is set to "1". When the replacement flag of the Nth address book data is set to "0" or, in other words, when the UIM card is not replaced, the judgment result is "NO", and the control section 13 proceeds to Step SJ10.

At Step SJ10, the control section 13 judges whether the value of the pointer register N has reached the number of registered entries extracted at Step SJ4. In other words, the control section 13 judges whether the search is completed. When the search is not completed, the judgment result is "NO", and the control section 13 proceeds to Step SJ11. After the control section 13 increments the value in the pointer register N by steps, the control section 13 returns the process to Step SJ6. When the replacement flag of the Nth address book data designated by the value of the incremented pointer register N is set to "1", the judgment result at Step SJ6 is "YES", and the control section 13 proceeds to Step SJ7. At Step SJ7, the control section 13 judges whether the slot number of the Nth address book data designated by the value in the pointer register N matches the slot number corresponding with the other-party number designated by the user. When the slot numbers do not match, the judgment result is "NO", and the control section 13 proceeds to Step SJ10.

At the same time, when the slot number of the Nth address book data designated by the value of the pointer register N matches the slot number corresponding with the other-party number designated by the user, the judgment result at Step SJ7 is "YES", and the control section 13 proceeds to Step SJ8. At Step SJ8, the control section 13 reads the slot number corresponding with the own number matching the call origination own number stored in the call origination own number storing section 14c from the own number storing section 14b. The control section 13 updates the read slot number to the Nth slot number and registers the updated slot number in the address book storing section 14a. Next, the control section 13 proceeds to Step SJ9 and sets the replacement flag of the Nth address book data designated by the value in the pointer register N to "0" and proceeds to Step SJ10. Then, at Step SJ10, when the value in the pointer register N reaches the number of registered entries and the control section 13 completes the search, the judgment result is "YES", and the control section 13 completes the process.

In this way, in the address book updating process, when the other-party number designated by the user is not registered in the address book storing section 14a, the control section 13 reads the slot number corresponding with the own number matching the call origination own number stored in the call origination own number storing section 14c from the own number storing section 14b. Then, the control section 13 corresponds the read slot number with the other-party number designated by the user and registers the corresponding slot number and other-party number in the address book storing section 14a. At the same time, when the other-party number and the slot number corresponding with the other-party number are registered in the address book storing section 14a, when the UIM card is replaced, the control section 13 reads the slot number corresponding with the own number matching the call origination own number stored in the call origination own number storing section 14c from the own number storing section 14b. The control section 13 corresponds the read slot number with the other-party number designated by the user. Then, the control section updates and registers the corresponding slot number and other-party number in the address book storing section 14a. In addition, the control section 13 resets the corresponding replacement flag to zero.

As described above, according to the second embodiment, when the other-party address of the call recipient and the slot number corresponding to the other-party address are registered in the address storing section 14a and the replacement flag attached to the corresponding slot number is "0", the control section 13 extracts the own number corresponding with the slot number from the own number storing section 14b. When the extracted own number and the call origination own number stored in the call origination own number storing section 14c match, the control section 13 originates a call to the other-party number using the call origination own number. As a result, the operation for selecting the own number every time a call is originated becomes unnecessary. The own numbers to be used at call origination can be used separately based on use, without the selection operation being performed.

In addition, when the other-party address of the call recipient and the slot number corresponding to the other-party address are not registered in the address storing section 14a, or when the other-party address of the call recipient and the slot number corresponding to the other-party address are registered in the address storing section 14a but the corresponding replacement flag is set to "1" due to the UIM card being replaced, the control section 13 instructs the update of the address book. In addition, the control section 13 extracts either one of the own number designated by the user or the own number selected from within the own number storing section 14b. When the extracted own number and the call origination own number stored in the call origination own number storing section 14c differ, the control section 13 stores the extracted own number in the call origination own number storing section 14c.

Then, when the other-party address designated by the user is not registered in the address book storing section 14a, the control section 13 reads the slot number corresponding with the own number matching the call origination own number stored in the call origination own number storing section 14c from the own number storing section 14b. The control section 13 corresponds the read slot number with the other-party number designated by the user and registers the corresponding slot number and other-party number in the address book storing section 14a.

In addition, when the other-party address and the slot number corresponding with the other-party address are registered in the address book storing section 14a, when the UIM card is replaced, the control section 13 reads the slot number corresponding with the own number matching the call origination own number stored in the call origination own number storing section 14c. The control section 13 corresponds the read slot number with the other-party number designated by the user. Then, the control section 13 updates and registers the corresponding slot number and other-party number in the address book storing section 14a. In addition, the control section 13 resets the corresponding replacement flag to zero. As a result, when the next and subsequent calls are originated, the operation to select the own number becomes unnecessary. The own numbers to be used at call origination can be used separately based on use, without the selection operation being performed.

Furthermore, although the computer program pro-duct of the mobile communication terminal that is a preferred embodiment of the present invention is stored in the memory (for example, ROM, etc.) of the mobile communication terminal, this processing program is stored on a computer-readable medium and should also be protected in the case of manufacturing, selling, etc. of only the program. In that case, the method of protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. A mobile communication terminal for selectively using a plurality of caller own numbers, comprising:

a number information memory means for storing number information correlating a caller own number and an other-party number;

a call origination designating means for designating an originating call to the other-party number;

a judgment means for judging whether or not the other-party number to which an originating call has been designated by the call origination designating means is present among the number information stored in the number information memory means;

a retrieval means for retrieving the caller own number corresponding to the other-party number when the other-party number has been judged as being present by the judgment means;

a first call origination means for calling the other-party number to which an originating call has been designating by the call origination designating means using the caller own number retrieved by the retrieval means to originate the call;

a caller own number storing means for storing a plurality of caller own numbers, which can currently be used;

a selection means for selecting any one of the plurality of caller own numbers stored in the caller own number storing means;

a second call origination means for calling the other-party number to which an originating call has been designated by the call origination designating means using the caller own number selected by the selection means, when the judgment means judges that the other-party number is not present or when the caller own number cannot be retrieved by the retrieval means; and a number information registration means for registering number information correlating the other-party number to which an originating call has been designated by the call origination designating means and the caller own number selected by the selection means in the number information memory means.

2. The mobile communication terminal according to claim 1, further comprising:
- a caller own number storing means for storing a plurality of caller own numbers, which can currently be used;
- a selection means for selecting any one of the plurality of caller own numbers stored in the caller own number storing means;
- a usability judgment means for judging whether or not the caller own number retrieved by the retrieval means is included in the plurality of caller own numbers stored in the caller own number storing means;
- a third call origination means for calling the other-party number to which an originating call has been designated by the call origination designating means using the caller own number selected by the selection means, when the usability judgment means judges that the own number is not included; and
- an update registration means for updating caller own numbers that are among the number information stored by the number information memory means and are same as the caller own number retrieved by the retrieval means by registering the caller own number selected by the selection means.

3. The mobile communication terminal according to claim 2 wherein:
the selection means is adapted to select a caller own number designated by a user from among the plurality of caller own numbers stored in the caller own number storing means.

4. The mobile communication terminal according to claim 1, comprising:
- a storing means for correlating and storing the caller own number and a slot number designating a memory medium to which the caller own number is recorded;
- wherein the caller own number is identified with the slot number by referring to a corresponding relationship between the caller own number and the slot number which is stored by the storing means.

5. A computer-readable storage medium having stored thereon a program that is executable by a processor in a mobile communication terminal that selectively uses a plurality of caller own numbers, the program being executable by the processor to perform a process comprising:
- a number information memory step of storing number information correlating a caller own number and an other-party number;
- a call origination designating step of designating an originating call to the other-party number;
- a judgment step of judging whether or not the other-party number to which an originating call has been designated by the call origination designating step is present among the number information stored by the number information memory step;
- a retrieval step of retrieving the caller own number corresponding to the other-party number when the other-party number has been judged as being present by the judgment step;
- a first call origination step for calling the other-party number to which an originating call has been designated by the call origination designating step using the caller own number retrieved by the retrieval step to originate the call;
- a caller own number storing step of storing a plurality of caller own numbers, which can currently be used;
- a selection step of selecting any one of the plurality of caller own numbers stored in the caller own number storing means;
- a second call origination step of calling the other-party number to which an originating call has been designated by the call origination designating means using the caller own number selected by the selection means, when the judgment means judges that the other-party number is not present or when the caller own number cannot be retrieved by the retrieval means; and
- a number information registration step of registering number information correlating the other-party number to which an originating call has been designated by the call origination designating means and the caller own number selected by the selection means in the number information memory means.

* * * * *